United States Patent [19]
Eriksson

[11] Patent Number: 5,636,457
[45] Date of Patent: Jun. 10, 1997

[54] METHOD OF DREDGING VIA FREEZING AND REMOVING SEDIMENT

[76] Inventor: Lars L. Eriksson, 108 Bedford Street, Port Hope, Ontario, Canada, L1A 1W6

[21] Appl. No.: 356,687

[22] Filed: Dec. 15, 1994

[30] Foreign Application Priority Data

Apr. 11, 1994 [CA] Canada ................................ 2121014

[51] Int. Cl.$^6$ ........................................................ E02F 1/00
[52] U.S. Cl. ........................ 37/195; 37/307; 37/210; 37/747; 37/774; 210/747; 210/774; 405/130; 405/303; 62/260; 165/45
[58] Field of Search .................... 37/195, 307; 210/774, 210/747; 405/128, 130, 131, 303, 272, 31, 25; 62/53.1, 260; 165/142, 45

[56] References Cited

U.S. PATENT DOCUMENTS

| | | |
|---|---|---|
| 1,704,577 | 3/1929 | Pomykala . |
| 3,614,874 | 10/1971 | Martindale et al. ................ 62/123 |

FOREIGN PATENT DOCUMENTS

| | | |
|---|---|---|
| 89118525.8 | 4/1990 | European Pat. Off. . |
| 3817691A1 | 11/1989 | Germany . |
| 361021235 | 1/1986 | Japan . |
| 6121235 | 1/1986 | Japan ........................................ 37/307 |

OTHER PUBLICATIONS

"Great Lakes Clean Up Fund, Sediment Removal Program" by Environment Canada, dated Jun. 1994.
"Cleanup Fund, Contaminated Sediment Removal Program" by Environment Canada.

*Primary Examiner*—Robert J. Popovics
*Attorney, Agent, or Firm*—Edward M. Livingston, Esq.

[57] ABSTRACT

A freezing cell having one or more freezing tines may be used to remove contaminated sediment from the beds of water bodies. The freezing tines are to be immersed into the sediment. Refrigerant is supplied to the tines by a refrigeration unit during the freezing cycle to solidify the surrounding sediment into a block held by the cell. The block of frozen sediment is lifted from the water body. The block is released from the freezing cell by heating the tines. The block is then transported for treatment. The freezing cell may be returned for reuse in sediment removal. The freezing cell may be configured to permit close placement of the cell to other like cells used in the extraction process. A method of freezing marine sediment into blocks is used to recover contaminants from water bodies.

17 Claims, 5 Drawing Sheets

METHOD OF DREDGING VIA FREEZING AND REMOVING SEDIMENT

The present invention relates to an apparatus and a method for removing bottom sediments from the bed of a river, stream, lake, marsh or other marine environment of the like.

The present invention provides an apparatus for removing bottom sediments from the bed of a water body, comprising a freezing cell having one or more submersible freezing elements, means for introducing the one or more freezing elements into contact with the bottom sediments, means adapted to freeze the bottom sediments into a substantially solid block in removable engagement with the freezing cell, and means for removing the block of bottom sediments from the water body.

The present invention provides a freezing cell for use in connection with a refrigeration unit for removing bottom sediments from the bed of a water body, the freezing cell comprising a support frame member adapted to rest on the surface of the bed, one or more freezing elements supported by the frame and downwardly projecting therefrom, the freezing elements being adapted for immersion into the bottom sediments, means for connecting the freezing elements to the refrigeration unit and adapted to form a substantially frozen block of sediment detachably engaged with the freezing cell, means adapted for detachably engaging the freezing cell to a lifting apparatus, and the freezing cell being adapted to closely abut with one or more freezing cells of substantially similar configuration.

An apparatus having one freezing element is also provided by the present invention. A freezing cell having a single freezing element may be used, for example, to obtain test samples of frozen sediment blocks which may then be analyzed in off site testing facilities. The configurations of the freezing cells of the present invention may be varied to meet desired performance characteristics or other design criteria.

The present invention also provides a method for removing contaminated sediments from the bed of a water body comprising the steps of: immersing refrigerating means into a defined sector of the uppermost layer of sediment, freezing a portion of the defined sector of the uppermost layer of sediment into a substantially solid block, removing the frozen block from the bed of the water body, and detaching the frozen block from the refrigerating means.

Toxic substances and other contaminants are commonly found in bottom sediments located in river beds, harbours, and other marine environments. In many cases, it is desirable to undertake cleanup operations to remove the toxic sediment materials and other contaminants from the marine environment and transport the extracted materials for processing and disposal at an alternate site. In sediment removal systems of the prior art, conventional clam-shell dredging equipment may be used to collect sediments and remove them from the bottom of the marine environment. Other systems, including auger-fed systems, employ an auger-like screw mechanism to collect the targeted sediments and transport those materials to a location outside of the water body. In other systems, suction devices are available to collect sedimentary materials such that the materials are picked up and transported elsewhere by application of suction to the targeted materials. Examples of conventional dredging systems are shown in publications by Environment Canada entitled, "Great Lakes Cleanup Fund, Sediment Removal Program (June, 1994)" and "Cleanup Fund, Contaminated Sediment Removal Program". The use of clam-shell buckets, auger fed and vacuum systems are shown for use in dredging and sediment recovery operations.

In connection with other art, namely, the production of fresh water through desalination, U.S. Pat. No. 3,614,874 to Martindale et al. discloses the use of a separating and melting apparatus for separating washed ice crystals and subsequently melting those crystals to produce desalinated water.

The sediment removal systems of the prior art gave rise to inherent disadvantages including relatively high turbidity levels in remaining water at the clean up site and substantially high volumes of extracted liquid effluent requiring further treatment as part of the total material extracted for processing and disposal.

In some of the systems of the prior art, the sediment removal process itself is responsible for increasing the turbidity of surrounding water to unacceptable levels. Measures are at times necessary to decrease turbidity levels by settling out contaminants which have entered into suspension in the surrounding water. During this disturbance, some toxic or other undesirable sedimentary materials may be dissolved into the water thereby increasing the contaminant load in the water body.

Removal systems of the prior art are also limited in their ability to remove sedimentary materials from irregularly shaped marine bed environments. Some systems of the prior art are also subject to breakdown due to the intake of debris or other oversized materials such as discarded cans, driftwood, and other materials found in marine beds. Many of the sediment removal systems of the prior art are limited in their ability to be used in small spaces or in locations where the sedimentary materials targeted for removal are present in a relatively thin layer.

According to one embodiment of the invention there is provided a freezer cell which is lowered into place on the bed of the water body. One or more freezing elements forming part of the freezer cell are immersed into the sediment found below the support frame of the freezer cell. Introduction of cooling fluid or other refrigerating means into the freezing cells will cause the water-soaked sediment found between adjacent freezing elements to chill the sediment into a frozen block. In the case of a single freezing element, the solid block will be formed around that single freezing element. The solid block will become engaged with the freezing cell and in particular, the one or more freezing elements. The freezing cell may be positioned to freeze a substantial quantity of sediment material while trapping relatively small quantities of non-targeted materials such as free water.

After the freezing cycle is completed, the freezing cell is removed by lifting means or other means such that the freezing cell and the engaged solid block of sediment are removed from the bottom of the water body and to a location outside of the water. In some embodiments of the invention, the frozen sediment block may be released from the freezer cell by partially heating the sediment block sufficiently to permit release of the block from the freezing cell. This may be accomplished by introducing a heated fluid into the freezing elements to an extent sufficient to partially melt the block and release the block from the freezing elements and the freezing cell. By only partially melting the sediment block, the block may be retained in substantially solid form for transport in refrigerated units to a remote location for processing and disposal, where required. The freezing cell, after removal of the sediment block, may be returned to the marine environment for re-use in freezing any remaining target sedimentary materials for extraction.

A freezing cell may be shaped to permit close fitting arrangement with other freezing cells of similar configuration when placed in abutting positions. A multiplicity of freezing cells may be connected to one or more refrigeration units capable of supplying sufficient refrigerant or other cooling means to the cells forming part of the sediment removal system. The size and capacity of the refrigeration units can be selected according to requirements for the particular clean up site, including the available number of freezing cells to be operated during any freezing cycle, the physical properties of the sediment, ambient temperatures and other factors readily apparent to those skilled in the art. Individual freezing cells may be positioned and removed from location to location within the designated treatment area by lifting means secured to each freezing cell. The lifting means will in many cases allow for detachable engagement to heavy lifting equipment. A crane or other lifting device may be used to position and remove the individual freezing cells.

Where one or more freezing cells are used to collect specimens of sedimentary material, the freezing cells may be positioned to obtain representative samples of materials found in defined sectors of the sediment bed. After completion of the freezing cycle, the cells may be extracted along with the specimen blocks for analysis of the frozen sediment contents. The test information may be used to target for extraction those designated sectors having, for example, high concentrations of deleterious materials.

Thawing trays may be supplied for use on shore or on barges positioned in close proximity to the area designated for sediment removal. Freezing cells which have completed the freezing cycle and are engaged with solid blocks of frozen sediment material may be moved to the thawing trays using a crane or other lifting device. The blocks may then be disengaged from the freezing cells and transported elsewhere for further handling.

According to the present invention, a method for removing sediment material from the bed of a water body is provided. The method, in one embodiment, may include the mapping of the target area into a grid pattern. Freezing cells may be placed into a first row of designated sectors within the grid pattern. The second row of freezing cells may be positioned in abutting relationship to the first row of freezing cells in the designated grid pattern. The freezing cells of the first row may then be removed and retrieved from the treatment area after the second abutting row of freezing cells has been put into place. The placement of the second row of freezing cells in close abutting relation in the designated treatment area may be used to decrease the tendency of sedimentary material to drift into the trench formed by removal of frozen solid blocks of sedimentary material from the first row. The described row-over-row method may be used to remove sediment material along a desired direction in a target area. Typically, before a clean up operation will be initiated, some field testing and laboratory tests will be conducted to determine the location and extent of contaminants found in the sediment material. After the testing is completed and a profile identifying the locations of target materials has been generated, the method of the present invention may be used to selectively remove the sediment layers containing particularly toxic or noxious materials for special treatment.

The method of the present invention may also be practiced to remove defined layers of sedimentary materials to allow different handling, treatment and processing procedures for the frozen sediment blocks extracted from the different layers. A method is thereby provided which may be used to segregate materials requiring different treatment and handling procedures from other materials to reduce the overall volume, time or treatment costs for a particular clean up operation.

Drawings are appended hereto which illustrate exemplary embodiments of the present invention.

FIG. 2A is an enlarged sectional view of another embodiment of the present invention;

Figure 1:
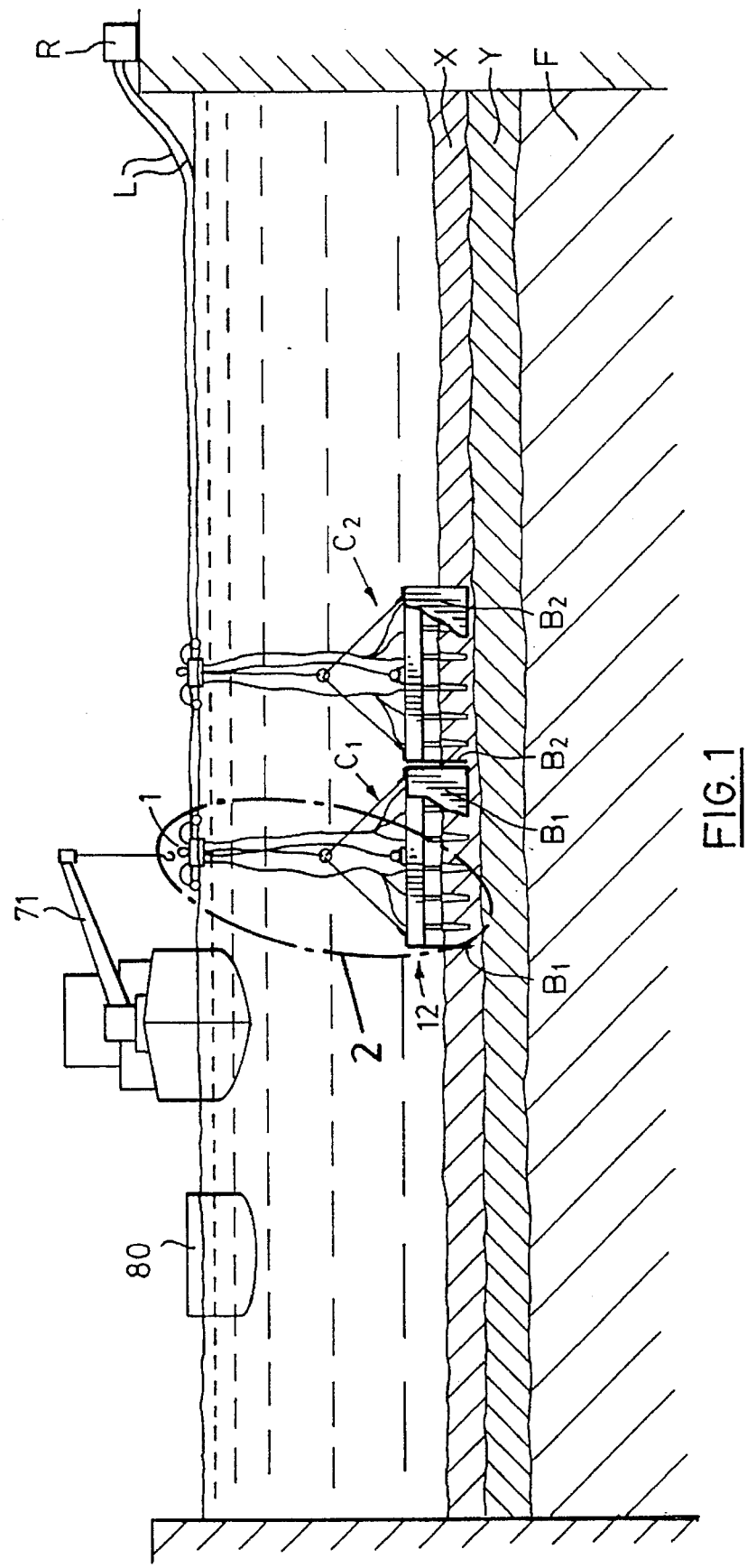
FIG. 1 is a schematic sectional view showing one embodiment of the present invention, partially submerged in a marine environment.
Figure 1A:
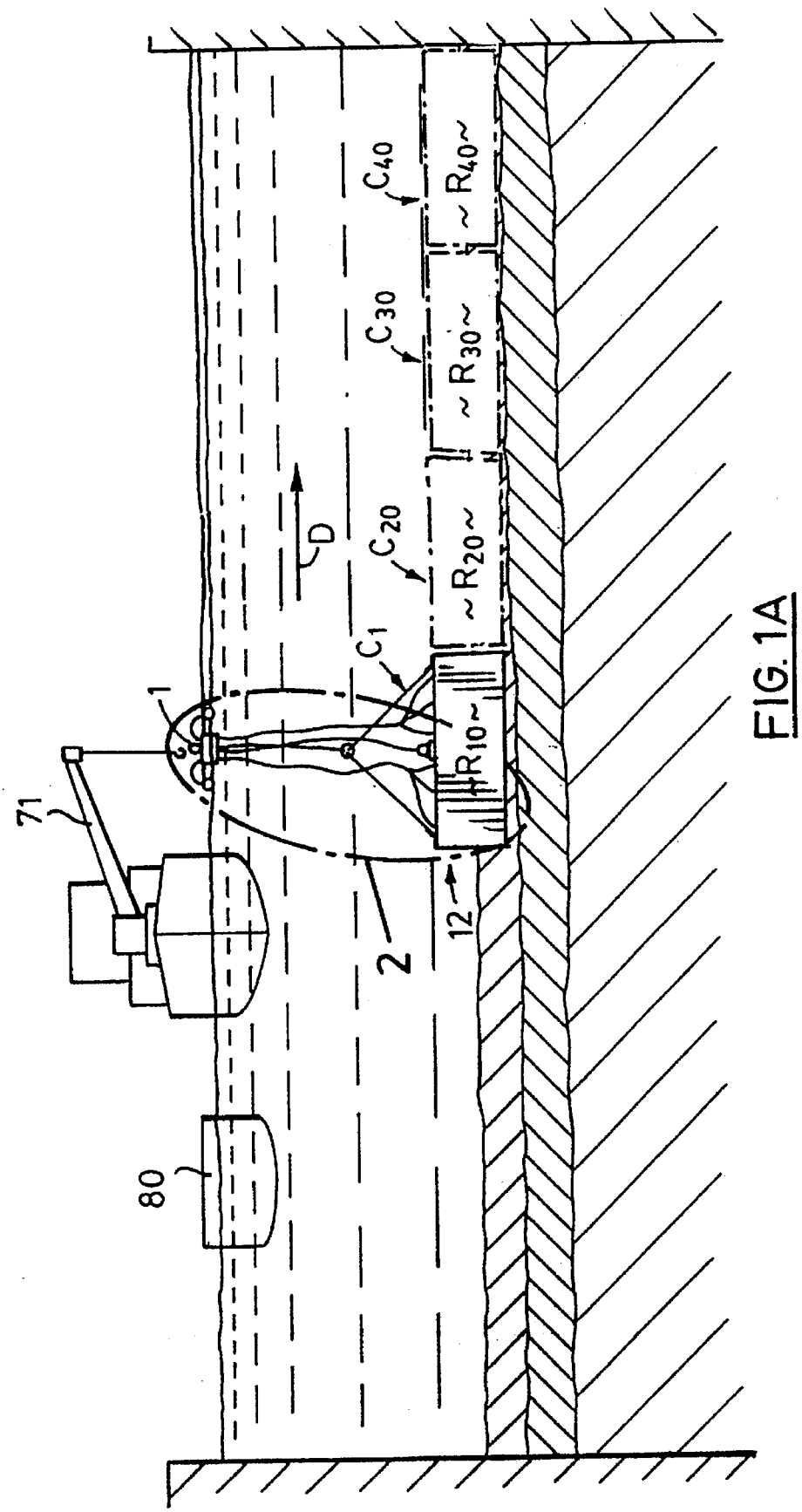
FIG. 1A is a schematic sectional view showing an embodiment of the present invention, partially submerged in a marine environment.
Figure 2:
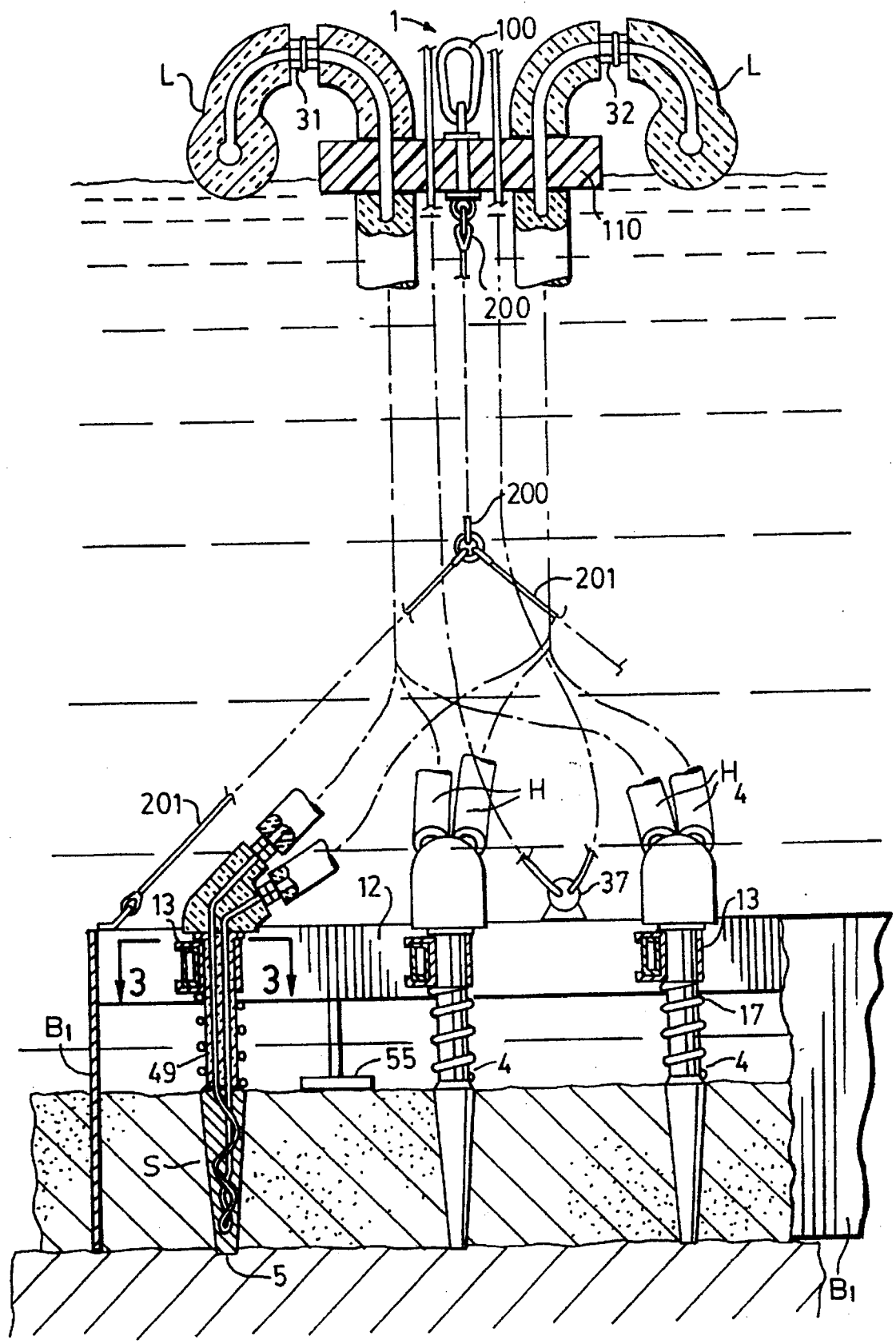
FIG. 2 is an enlarged sectional view of a portion of the embodiment of the present invention shown in FIG. 1.

FIG. 1 shows two freezing cells C1 and C2 of the present invention and more particularly, the cells are partially submerged in close relation below the surface of a water body. FIG. 2 is an enlarged partial sectional view of the enclosed area 2 shown in FIG. 1. With reference to FIGS. 1, 1A and 2, freezing cell C1, a preferred embodiment, has a lift coupling 1 attached to a frame member 12. Fluid couplings 31, 32 are provided for connection to refrigerant supply and return lines L. Refrigerant may be supplied to the freezing cell from an external refrigeration unit R including satisfactory compressor and refrigerant supply and return lines. The size and rating of the external refrigeration unit may be selected with sufficient capacity to supply cooling fluids to a desirable number of freezing cells such that the supply is adequate to achieve an optimum freezing cycle time for a particular site. Typically, reinforced flexible hosing may be used for supply and return lines. The couplings 31 and 32 may incorporate quick-connect features to permit rapid connection and disengagement from the refrigerant lines. Check-valve features may also be incorporated in the couplings to minimize the escape of refrigerant into the environment. The freezer cell C1 may also include tubing or flexible hose lines H for distribution and return of refrigerants to and from individual freezing elements 4.

In this embodiment, the freezing cell C1 is shown with a number of freezing elements, each having a substantially smooth surface S gently tapered toward the distal end 5 of the element. The element is substantially tine shaped. The tine is configured to permit refrigerant to flow through the element in a manner suitable to cool surrounding sediment. The lower portion of the tine is placed in contact with surrounding sediment. The upper portion 49 of each tine may be insulated internally to hinder the formation of ice about the upper portion of each tine or other elements of the freezing cell. The tapered surface S of the tine enhances the ability of the tine to be immersed into sediment, particularly, finely compacted sediment layers. The tapered shape of the tine also improves the ease of releasing frozen blocks of sediment material from the freezing tines after completion of the freezing cycle. The overall shape of the tine may be varied according to the nature and strength of the materials used to manufacture the tines, the thermal conductivity and heat capacity of targeted sediments, desirable freezing cycle times, and other factors. The freezing tine 4 may be independently mounted on the support frame 12. As described further above, the cell may be provided with means to permit the tines to retract independently from each other and relative to the support frame.

In some applications, it may be desirable to provide baffle means B1, B2 to hinder the flow of loose sediment horizontally through the freezing cell. In marine bodies where the bed is sloped at an angle to the horizontal plane, sediment may slip down the slope of the bed during the extraction process. Baffles B1 may be provided in a freezing cell C1(and baffles B2 in sell C2) by means of a skirt or other downwardly projecting members located along the periphery of the cell. Alternately, the tines may be configured and shaped to reduce the tendency of sedimentary materials to flow through the cell. It is possible to provide baffle features in other ways which can be suited for a particular marine environment.

The effective cooling surface of the various tines, their overall shape, and the relative placement of the freezing tines within the freezing cell, will in many cases, affect the freezing cycle times and the configurations of frozen sediment blocks. The configuration and placement of tines should be adapted to minimize the extent to which the sediment block grows to become engaged with portions of the freezing cell which may inhibit relatively easy disengagement of the block during the thawing cycle. The tines may be arranged in a number of rows, the rows being placed in side by side arrays such that the distance between adjacent tines is substantially the same.

In this embodiment, the individual freezing elements 4 are independently connected to the frame 12 in a manner permitting upward displacement of the individual tine 4 in the event of contact with a hard surface or other obstruction. The individual tine 4 is downwardly biased against such movement by a spring 17. Alternative biasing means may, of course, be used. Where such movement of the tines relative to the frame 12 is permitted, flexible hosing H may be used to permit satisfactory distribution and return of refrigerant from the movable tines.

The tines 4 are shown submerged in sediment material selected for freezing and subsequent removal. After lowering the freezing cell onto the sediment, a vibrator 37, which is shown as attached to the frame, may be activated to lower the tines into the sediment by vibrational action. A number of support pads 55 may be provided to support the cell frame at a desirable height above the sediment and thereby allow immersion of the tines to a preselected depth. After immersion in the sediment material, the refrigeration unit is operated to supply refrigerant through the various tines, in turn cooling the sediment material to form a frozen block of sediment engaged with the various tines. Upon completion of the freezing cycle, a crane or other lifting equipment is engaged with the lift coupling 1. The freezing cell C1 together with the engaged frozen sediment block are removed from the bottom of the water body by a floating crane 71 and placed onto a barge 80 or other transport means. The freezing cell and frozen sediment block may be lifted and placed into a thawing tray. The freezing cell may be disconnected from the refrigerant lines and couplings 31, 32 may be connected to a supply source for heated liquid. Where appropriate equipment is available, the refrigeration unit may be adjusted to act as a source of heated fluid. Heated liquid may then be passed through the same fluid lines previously used to supply cooling fluid to the tines 4. The heated liquid supplied in this cycle may be used to heat the tines 4 and partially melt the sediment block to an extent sufficient to permit removal of the frozen sediment block from the freezing cell. The freezing cell may then be disengaged from the remaining sediment block and the heating source. The cell may then be returned for reconnection to a refrigeration supply for reuse in the freezing and extraction of other sediment materials.

Frozen sediment blocks may then be transported for storage for further treatment and disposal as may be required. In those instances where it is desirable to do so, the frozen sediment blocks may be placed in refrigerated or suitably insulated containers for shipment and treatment. Transportation of the sediments in solid form in many instances will reduce risks associated with the transportation of hazardous waste materials. When transported in solid form, an accident or other upset involving a transportation vehicle will, in many cases, be easier to clean up where emergency response teams have quickly arrived at a spill site and collected the solid sediment blocks before melting has occurred to any significant extent.

Freezing cell C1 and freezing cell C2 are substantially of similar configurations. Freezing cell C1 and freezing cell C2 may be configured to provide nesting for improved handling, transportation and storage requirements.

The freezing cells C1 and C2 may also be configured to provide for close fitting arrangement when they are placed in abutting relationship. Freezing cells C1 and C2 may be operated contemporaneously or the freezing cycles may be phased differently according to availability of refrigeration supplies, availability of lift means and the like.

A plurality of freezing cells may be employed to systematically remove layers of sediment material from targeted clean up areas. For example, a plurality of freezing cells may be used to remove one or more covering layers of sediment which may contain substantially inert materials to expose underlying layers of sediment containing noxious or toxic materials for removal by using the freezing system according to the present invention. With reference to FIG. 1, the freezing elements 4 of the freezing cells are shown submerged in a layer of uncontaminated silt or sediment X. The uncontaminated layer X is shown as positioned above an underlying contaminated sediment layer Y. A clean harbour floor F is shown underlying the contaminated layer Y. According to the method of the present invention, the uncontaminated layer X may be selectively removed leaving the underlying contaminated layer Y for segregated removal and treatment. By segregating and separating the layers of substantially different sediment materials, it is possible to selectively treat blocks of solid sediment extracted from different layers according to the particular treatment schemes which may be necessary for materials of that kind.

Figure 3:
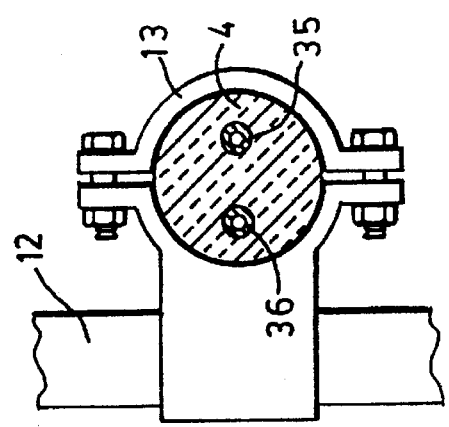
FIG. 3 is a partial section along 3—3 of the freezing cell of one embodiment of the present invention shown in FIG. 2.

In FIGS. 2 and 3, the freezing elements or tines 4 are shown as independently mounted on the frame 12. A mounting bracket 13 of split sleeve construction allows the tine 4 to slidably travel within the sleeve. The tines 4 project downwardly from the frame 12. Each tine may be substantially as shown, containing internal passageways 35, 36 for the flow of refrigerant fluid along the body of the tine. In this embodiment, each tine is capable of moving upwardly relative to the frame 12. A spring 17 or other means may be provided to bias the tines 4 downwardly from the frame 12 and into the sediment material. However, when a tine 4 comes into contact with debris or some other obstruction, the tine may be displaced upwardly so that the overall positioning of the freezing cell is not disturbed. The tine 4 is thereby provided with the capability to retract upon impact with irregularly shaped obstructions or other solid objects found below the surface of the sediment bed.

The frame 12 is configured to support the individual freezing elements or tines 4 and any hosing or refrigerant lines connecting the individual elements to the refrigerant supply. The frame 12 may be configured to allow the frame to sit substantially above the surface of the sediment bed. Although support pads 55 are shown supporting the cell frame by resting on the surface of the sediment bed, the frame 12 may be supported in other ways. Adjustable frames may be provided to permit variation of the distance which the tines will be immersed into underlying sediment material. Adjustment means may comprise inner and outer flame components whereby the freezing elements are supported on a first frame member and the placement of the second outer frame may be varied relative to the first inner frame. The outer frame may be configured to substantially rest on the surface of the sediment layer. By adjusting the relative positions of the inner and outer frame members, the outer frame may be positioned in a manner which will effectively increase or decrease, as the case may be, the depth to which the tines will be immersed into the underlying layer of sediment. After adjustment, the tines will be immersed into the underlying sediment in accordance with the preselected depth setting. The tines may be constructed to be detachable and interchangeable with other tines of different lengths. By removing and substituting longer or shorter tines, the cell may be adjusted to permit extraction of thicker or thinner frozen blocks of sediment, as the case may be. A lifting eye 100 is shown coupled to a lift cable member 200. The lift cable 200 is connected to the frame 12 by intermediate flexible cables 201. A flotation block 110 is used to support the lifting eye 100 at a point visible above water. Such a feature may be used by crane operators to readily locate and remove freezing cells which have been submerged for use in the freezing cycle. A sensor may be provided (not shown) to measure the formation of solidified sediment in proximity to the various freezing tines. A sensor such as a temperature measuring device may, in appropriate circumstances, be used to determine when substantially all of the sediment located between the freezing elements of a freezing cell have frozen into a block suitable for extraction.

Figure 4:
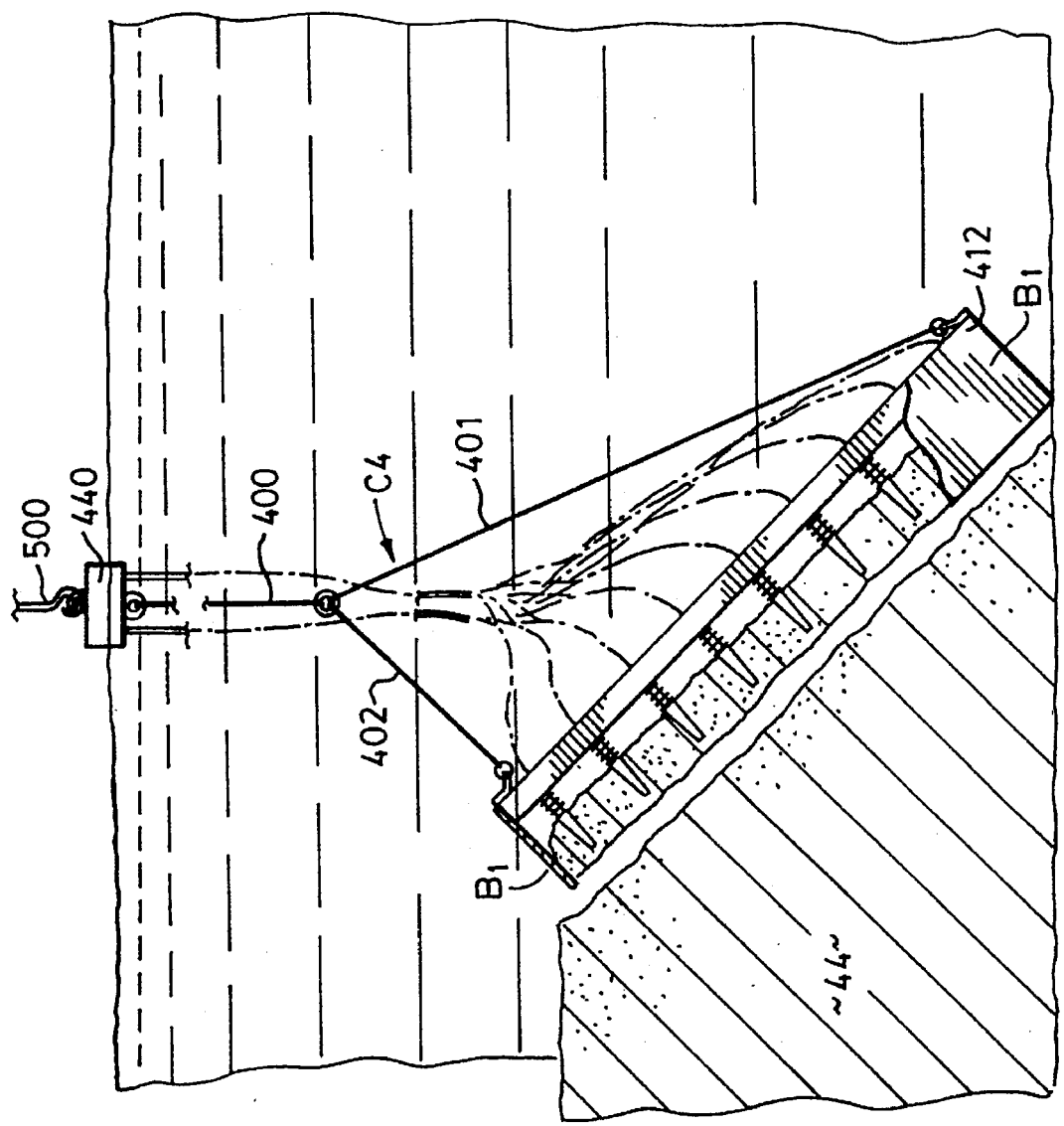
FIG. 4 is an elevational view of one embodiment of the present invention positioned in an angled sector of contaminated sediment; =P

In other embodiments, (not shown), insulated refrigerant supply and return lines may be incorporated in rigid connecting members and the frame member for distribution of refrigerants to individual freezing tine members. Insulation and other materials may also be used to minimize the formation of frozen sediment or the freezing of free water around undesirable locations in the freezing cell. Flexible couplings between the main refrigerant supply lines and the individual freezing tines 4 may be provided to enable relative movement of the individual tines. The use of flexible hosing or other suitable supply lines will enable relative movement of the tines, particularly, when individual tines impact upon obstructions or other barriers. In FIG. 4 of the drawings, an embodiment of the present invention, and in particular, a freezing cell C4, is shown positioned at an angle relative to the horizontal reference plane. The lift eye, held above the surface of the water body by flotation block 440, is engaged with a lifting hook 500. Lifting cables 400, 401 and 402 are shown connected to the cell frame 412. The cables may be adjustable to permit angled orientation of the frame and tines during lifting or lowering of the cell. In particular, the freezing cell C4 is shown engaged with a sediment block positioned at an angle substantially corresponding to the natural angle of repose of the contaminated sediment 44 targeted for removal. By positioning the freezing cell at an angle substantially conforming with the natural angle of repose of the sediment, the sediment may be frozen and subsequently removed in blocks which leave the underlying unfrozen sediments substantially undisturbed for removal in subsequent freezing cycles. Upon completion of the freezing cycle, the freezing cell and engaged frozen block of sediment material may be gently lifted to the water body surface for removal thereby minimizing the slippage or drift of contaminated sediment into a clean, previously decontaminated zone.

It is understood that certain embodiments of the freezing cell of the present invention may have only a single freezing element configuration which is adapted to function in place of a plurality of individual freezing tines or like elements. For example, downwardly projecting freezing panels of relatively thin walled construction may be integrally connected to form a grid or other configuration suitable for freezing engagement with sediment blocks. The individual panel segments may also be tapered to more readily enable the freezing element to be immersed into the sediment. The integral connection of similar freezing panels into a single freezing element is another embodiment of the present invention.

The configuration of the freezing element or elements in a freezing cell will in many cases result in an overall square or rectangular shape when the cells are observed in plan view. Such a configuration will enhance close placement of like freezing cells during the freezing cycle, thereby minimizing windrows and other formations of leftover target sediments which might otherwise be missed between submerged freezing cells. In some applications it may be desirable to link adjacent freezing cells to minimize the extent to which they may separate during the immersion or removal stages.

In yet another embodiment of the present invention, a freezing cell having a single freezing element is provided. Such a freezing cell may be used to retrieve test specimens of sediment for analysis at off site locations. An example of a freezing cell of a single element construction is shown in FIG. 2A. In this figure, the freezing cell 250 is shown substantially immersed into a sediment bed made up of sediment layers S1, S2, S3, S4, S5, and S6 located below water body W. The cell 250 is shown with a lift coupling 212 secured to the upper portion of the cell body. The lift coupling 212 is fastened to a rigid placement rod 210 by means of a quick release catch 211. The rod 210 may be used to accurately lower the cell into place so that the freezing tine 245 is immersed into the sediment bed. Navigational aids may also be used, if desired, to accurately plot the location of the test cell on the sediment bed. A support pad 225 is at rest on the surface 209 of the sediment bed. The support pad 225 is provided to prevent the cell from being immersed beyond a predetermined depth. The position of the support pad relative to the freezing tine may be adjustable so that the immersion depth of the tine into the sediment bed can be varied if required. After immersion of the tine, the rod 210 may be released from the cell by operating the quick release catch 211. A float 215 is used to indicate the location of the submerged cell. The float 215 is connected to a retainer line 214 which is provided at the other end with a retainer ring 213 engaged with the lift coupling 212. The retainer line may be used to extract the freezing cell and the frozen sediment block 230 upon completion of the freezing cycle.

The cell 250 is shown with refrigerant supply and return lines connected to an external refrigeration unit Rf. The refrigerant supply line is connected to inlet coupling 220. The refrigerant return line is connected to outlet coupling 221. An internal supply passage for cooling fluid extends through the freezing cell in communicating relation between inlet 220 and outlet coupling 221 thereby connecting the inlet and outlet supply lines. Refrigerant fluid is circulated through the thermally conductive portion 235 of the body of the tine 245 and then returned to the refrigeration unit Rf. The upper portion 223 of the cell 250 may be made of thermally insulating material to inhibit the freezing of surrounding free water which comes into contact with the cell. If desired, a shut off device (not shown) may also be provided to stop the refrigeration cycle when the frozen sediment block has reached a desirable size.

The frozen sediment block 230 will often provide a core sample which accurately reflects the layering of sedimentary deposits which form the sediment bed. Freezing of the sediment layers into a solid block will permit analysis of the discreet layers of the bed to identify those deposit layers which may be of particular interest for removal or other purposes. Sediment beds containing relatively high levels of water are prone to mixing of the contents of the discreet layers if conventional removal techniques such as suction are used for extraction. On the other hand, the device of the present invention can be introduced into such beds with minimal disturbance of the sediment layers.

In certain applications, it may be desirable to provide a protective cover or other means to reduce the amount of sediment which might otherwise be released into the surrounding water upon removal of the frozen sediment block from the sediment bed. For example, a detachable tubular shell made of biodegradable material may be used together with a freezing cell of the type shown in FIG. 2A. The shell may be designed to be fitted around the freezing tine. The shell may be securely emplaced into the sediment bed so that the tine, positioned within the hollow center of the tubular shell, is allowed to freeze the sediment intermediate of the tine and the outer shell. Upon completion of the freezing cycle and freezing of substantially all of the sediment within the chamber formed between the tine and the outer shell, the shell may be disengaged from the cell and the sediment block. The cell together with the frozen sediment block may then be removed from the sediment bed with very little, if any, sediment disturbance or movement into the water body. Other means may be used to reduce turbidity resulting from disturbances of the sediment bed. As yet another example, a prerolled plastic sheath (not shown) may be provided for use with the freezing cell. The sheath may be positioned adjacent the lower surface of the support pad 225 so that it is placed on the surface 209 of the bed along with the upper portion of the freezing cell. One end of the sheath may be weighted so that the sheath unrolls when the frozen sediment block is extracted from the bed. The sheath can be designed to envelope the frozen block and any adhering unfrozen sediment upon extraction so that the amount of sediment entering the water phase is minimized.

Other cooling or refrigerating means may be provided in a freezing cell of the present invention. For example, a cooling element may be designed to inject an inert cooling fluid at discreet points in the sediment layers surrounding the immersed cooling element. Liquid nitrogen or other non-toxic cooling material may be injected into the surrounding sediment layers in order to freeze the sediment in detachable engagement with the freezing element. In particular test sites where it is desirable to minimize the amount of test sample sediment material which is to be extracted, the freezing element may be provided with injector ports positioned to introduce cooling fluid into the sediment at a minimum number of positions along the length of the freezing element. It may be desirable to employ such a device where there are concerns about disposing any hazardous waste contained in frozen sediment extracted from the target sediment bed. It will then be possible to extract small quantities of frozen sediment from discreet points at significantly different depths within the sediment bed. The configuration and design of the cooling elements may be varied in other ways to ensure the formation of one or more frozen sediment blocks which are engaged with the cell.

According to the present invention, a method is provided for removing contaminated sediments from a bed of a water body by freezing a portion of a designated layer of sediment material into a substantially solid block. The method involves the immersion of a cooling device into a defined sector of the sediment material designated for removal. Upon immersion of the cooling device, the device is allowed to remain in the sediment layer during a freezing cycle until a substantially solid block of frozen sediment material is formed. The frozen block of sediment material is removed from the water body. The frozen block may be detached from the cooling device by partially thawing the frozen sediment block. The frozen block of sediment is only partially thawed to an extent sufficient to permit the detachment of the block from the cooling device. The frozen block of sediment material may then be transported to a remote location for processing and disposal of sediment and water based contaminants.

In another embodiment of the present invention, a method of freezing sediment blocks of material from one or more sediment layers is provided. The immersion of a refrigeration device into one or more layers of sediment may be employed to generate either one solid continuous block extending between discreet layers of sediment or one or more discreet frozen blocks representing sample points along the length of the immersed cooling device. The latter method of generating one or more sediment blocks at discreet depths of the sediment bed may be of particular value in collecting test specimens for analysis where the amount of sample material to be extracted ought to be minimized.

Figure 5:
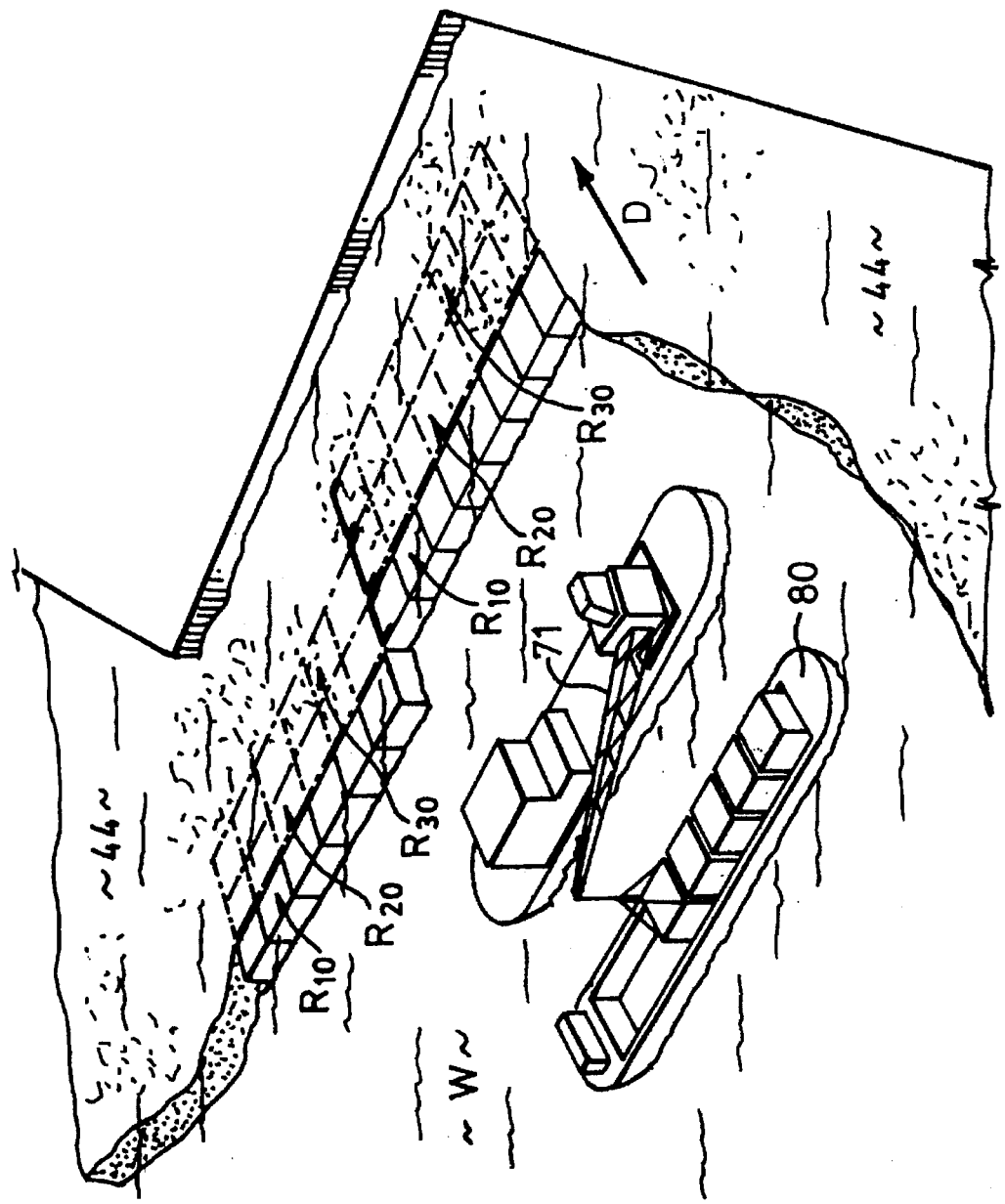
FIG. 5 is a schematic view showing one embodiment of the present invention submerged in a marine environment.

According to another embodiment of the present invention shown in FIG. 5 and 1A, a plurality of refrigerating devices C1, C20, C30, and C40 may be placed into row-like arrangements R10, R20, R30 and R40 in defined sectors of the sediment designated for removal. The refrigerating devices may be operated in a freezing cycle to form sediment blocks for extraction. A second group of refrigerating devices may be arranged in a second row R20 on the surface of the sediment designated for removal, in abutting relationship to the first row R10 of refrigerating devices. The first row R10 of refrigerating devices may be removed after the second row R20 of devices have been emplaced for freezing. The placement of one row adjacent another row of devices may be used to minimize the migration of contaminated sediments into a previously decontaminated zone, including the trench formed by extraction of frozen sediment blocks from within the first row of refrigerating devices. The row over row technique may be used to extract sediment along an entire layer of targeted material, from one end of a targeted area to the other, (in the direction shown by arrow D in FIG. 1A and FIG. 5) thereby minimizing drift of contaminated sediments and the like.

In another embodiment of the present invention, various layers of sediments may be identified according to relative degrees of contamination or other characteristics. A first layer of sediment materials may be substantially removed by freezing the sediment into blocks and moving the solid blocks from the bed. The freezing method may then be repeated to substantially remove the next underlying layer. It is to be understood that it will not, in most cases, be necessary to remove virtually all of a first layer before proceeding to remove the next layer using this method. It may also be desirable in some instances to select the relative thicknesses of the adjacent layers to be extracted using this method. For example, a first sediment layer may contain little or no contamination and will require very little treatment or processing. Substantially all of the first layer may be extracted to expose the underlying contaminated layer. The refrigerating devices may be adjusted to extract sediment from the upper layer to a depth approaching very close to the depth where significant levels of contaminants are found. Substantially all of the first layer of frozen sediment is frozen and extracted. The refrigerating devices may then be readjusted to extract sediment to a depth corresponding substantially to the thickness of the contaminated second layer. The blocks of frozen sediments from the first and second layers may then be segregated for different handling and other procedures.

Further useful modifications to the apparatus and methods disclosed herein may be made without departing from the scope of this invention. Such useful modifications will be apparent to those skilled in the art and are intended to be covered by the following claims.

I claim:

1. A method for removing contaminated sediments from a sediment bed of a water body, comprising the steps of:
   (a) immersing refrigerating means into one or more layers of a defined sector of the sediment bed;
   (b) providing at least one barrier between the refrigerating means and the sediment bed, the barrier being adapted to inhibit migration of sediment;
   (c) freezing a portion of each of the one or more layers of the defined sector of the sediment bed into one or more substantially solid blocks detachably engaged with the refrigerating means;
   (d) removing said one or more substantially solid blocks from the sediment bed of the water body; and
   (e) detaching said one or more substantially solid blocks from the refrigerating means.

2. The method of claim 1 further comprising the step of transporting said one or more substantially solid blocks to a location remote from the water body for processing and disposal of the sediments.

3. The method of claim 1 further comprising the steps of immersing a plurality of refrigerating means into a defined first row of defined sector portions of an uppermost layer of sediment, freezing sediment blocks in the defined first row of the uppermost layer, immersing a second plurality of refrigerating means into a second row of sector portions in the uppermost layer forward of and abutting the first row, and removing the sediment blocks formed in the defined first row.

4. The method of claim 1 further comprising the steps of freezing substantially all of a first layer of the defined sector of sediment by freezing the sediment into blocks, removing the blocks from the sediment bed of the water body and repeating said steps of freezing and removing a next adjacent layer of sediment located beneath the first layer.

5. The method of claim 4 further comprising the steps of determining a depth of a first layer of sediment blocks to be substantially equal to said depth of said first layer of sediment and determining a depth of a next adjacent layer of sediment blocks to be substantially equal to said depth of the next adjacent layer of sediment to reduce an amount of frozen sediment to be processed for treatment of contaminants.

6. The method of claim 1 further comprising the step of positioning the refrigerating means at an angle substantially equal to an angle of repose of the sediment bed.

7. The method of claim 1 further comprising the step of injecting an inert cooling fluid into said one or more layers of a defined sector of the sediment bed adjacent the refrigerating means.

8. A method as claimed in claim 1 further comprising the step of enveloping said one or more substantially solid blocks during removal of said blocks from the sediment bed.

9. A method for removing one or more contaminated layers from a sediment bed of a water body, comprising the steps of:
   (a) immersing a plurality of refrigerating means into a first row of abutting sector portions of a first layer of the sediment bed;
   (b) freezing sediment into substantially solid blocks detachably engaged with refrigerating means in the first row of the first layer;
   (c) immersing a second plurality of refrigerating means into a second row of abutting sector portions in the first layer, the second row being forward of and abutting the first row; and
   (d) removing the substantially solid blocks formed in the defined first row from the sediment bed prior to removal of the second plurality of refrigerating means from the sediment bed.

10. The method of claim 9 further comprising the step of injecting an inert cooling fluid into sediment bed portions adjacent the refrigerating means.

11. A method for removing contaminated sediment from a sediment bed of a water body, comprising the steps of:
   (a) immersing refrigerating means into a plurality of adjacent layers of said sediment bed;
   (b) freezing portions of the layers of the sediment bed into substantially solid blocks detachably engaged in an array along the refrigerating means; and
   (c) extracting the substantially solid blocks from the sediment bed of the water body.

12. A method as claimed in claim 11 further comprising the step of injecting an inert refrigerant fluid into sediment portions abutting the refrigerating means.

13. A method as claimed in claim 11 further comprising the step of enveloping the substantially solid blocks during extraction of said blocks from the sediment bed.

14. A method for removing sediment from a marine environment, comprising the steps of:
   (a) immersing freezing means into a sediment bed;
   (b) providing a barrier, adjacent a perimeter of the freezing means;
   (c) freezing a portion of the sediment bed into a block detachably engaged with the freezing means;
   (d) removing the block from the sediment bed; and
   (e) detaching the block from the freezing means.

15. The method of claim 14, wherein the freezing means defines a first sector of the sediment bed, further comprising the step of immersing a second freezing means into the sediment bed in abutting relation to the first sector and operating the second freezing means according to steps (b), (c), (d) and (e) of the method in claim 14.

16. The method of claim 15 wherein the blocks are detached from the freezing means in close proximity to the marine environment.

17. The method of claim 16 wherein heating fluid is introduced into the freezing means to enhance disengagement of the blocks from the freezing means.

* * * * *